United States Patent
Honda

(10) Patent No.: US 6,920,053 B2
(45) Date of Patent: *Jul. 19, 2005

(54) ACTIVE EMI FILTER HAVING NO INDUCTIVE CURRENT SENSING DEVICE

(75) Inventor: Jun Honda, El Segundo, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/860,755

(22) Filed: Jun. 3, 2004

(65) Prior Publication Data

US 2004/0246751 A1 Dec. 9, 2004

Related U.S. Application Data

(60) Provisional application No. 60/476,263, filed on Jun. 4, 2003.

(51) Int. Cl.[7] .................................. H02M 1/12
(52) U.S. Cl. ............................. 363/39; 363/40; 363/44
(58) Field of Search ............................. 363/39, 40, 44, 363/46, 47

(56) References Cited

U.S. PATENT DOCUMENTS

| | | | | |
|---|---|---|---|---|
| 4,710,861 A | * | 12/1987 | Kanner | 363/46 |
| 4,761,725 A | * | 8/1988 | Henze | 363/46 |
| 4,829,416 A | * | 5/1989 | Inaba et al. | 363/41 |
| 5,181,159 A | * | 1/1993 | Peterson et al. | 363/89 |

* cited by examiner

Primary Examiner—Bao Q. Vu
(74) Attorney, Agent, or Firm—Ostrolenk, Faber, Gerb & Soffen, LLP

(57) ABSTRACT

An active EMI filter senses current in a ground line as a voltage across a capacitor coupled to the ground line. The EMI filter senses common mode voltage and determines a difference between the common mode voltage and noise to provide an output to the ground line to reduce the difference.

34 Claims, 3 Drawing Sheets

ACTIVE EMI FILTER HAVING NO INDUCTIVE CURRENT SENSING DEVICE

CROSS-REFERENCE TO RELATED APPLICATION

This application is based upon and claims priority of U.S. Provisional Patent Application Ser. No. 60/476,263 filed by Jun Honda on Jun. 4, 2003 (IR-2483 PROV), incorporated by reference.

BACKGROUND OF THE INVENTION

1. Field of the Invention

The present invention relates to EMI reduction in switching motor drive systems, and more particularly to an active filter for EMI reduction that does not use an inductive current sensing device.

2. Background Art

In variable frequency inverter motor drive applications, and similar systems, a significant amount of common mode noise current is generated by its switching events and, in the absence of EMI filtering, flows back to the utility line. An EMI filter can be inserted to eliminate the amount of noise current that flows back to the line.

Conventional passive EMI filters for common-mode noise comprise inductors which are inserted into the line in series, and Y capacitors which are connected between the line and ground. Since the capacitance of a Y capacitor must be limited in order to limit the leakage current that flows through the Y capacitor, large common node inductors must generally be used to satisfy accepted EMI standards.

To address these problems of passive EMI filters, an active EMI filter as described herein gives an alternative solution that can potentially reduce both size and cost.

The basic idea of active common mode noise cancellation is to detect common mode noise current and duplicate it with the same amplitude but with reverse polarity, and then inject into the ground line to cancel out the noise current. As a result, all the common mode noise current from the inverter will be diverted to a closed loop created by the active filter circuitry and will not go back to the utility line.

Active EMI filters of this type are described in International Rectifier Corp.'s U.S. Pat. No. 6,636,107 and U.S. patent application Ser. Nos. 10/336,157; 10/426,123; and 10/443,686. The disclosures of the foregoing patent documents are incorporated by reference in their entirety.

However, in order to detect the common mode noise current to be canceled, the prior art has used an inductive current sensing device such as a current transformer. This kind of current sensing device, having a magnetic circuit, has flux leakage and other imperfections such as nonlinearity that restrict the overall performance of the active filter. Also, the magnetic circuit in this sort of current sensing device is bulky. Therefore, this type of active filter is not suitable to be integrated onto a silicon chip.

International Rectifier's U.S. Ser. No. 10/602,162, incorporated by reference, discloses an active EMI filter that does not require an inductive current sensing device. Further improvements in this type of filter are desired.

SUMMARY OF THE INVENTION

The proposed topology has a voltage input instead of a current sensing device to capture the common mode noise current to be canceled. Instead of current sensing as in the prior art, an error amplifier senses the voltage difference between one of the AC lines and ground. The amplifier has a certain amount of impedance, which induces a voltage due to the noise current. The error amplifier creates a canceling current by amplifying the voltage difference between the line and ground. The canceling current is supplied to the ground line to compensate for the common mode noise current.

The amplifier has three inputs, the voltage input and two current inputs. The second input detects current at the output isolation capacitor. The third input is provided for improving high-frequency response.

Other features and advantages of the present invention will become apparent from the following description of the invention which refers to the accompanying drawings.

DETAILED DESCRIPTION OF AN EMBODIMENT OF THE INVENTION

Figure 1A:
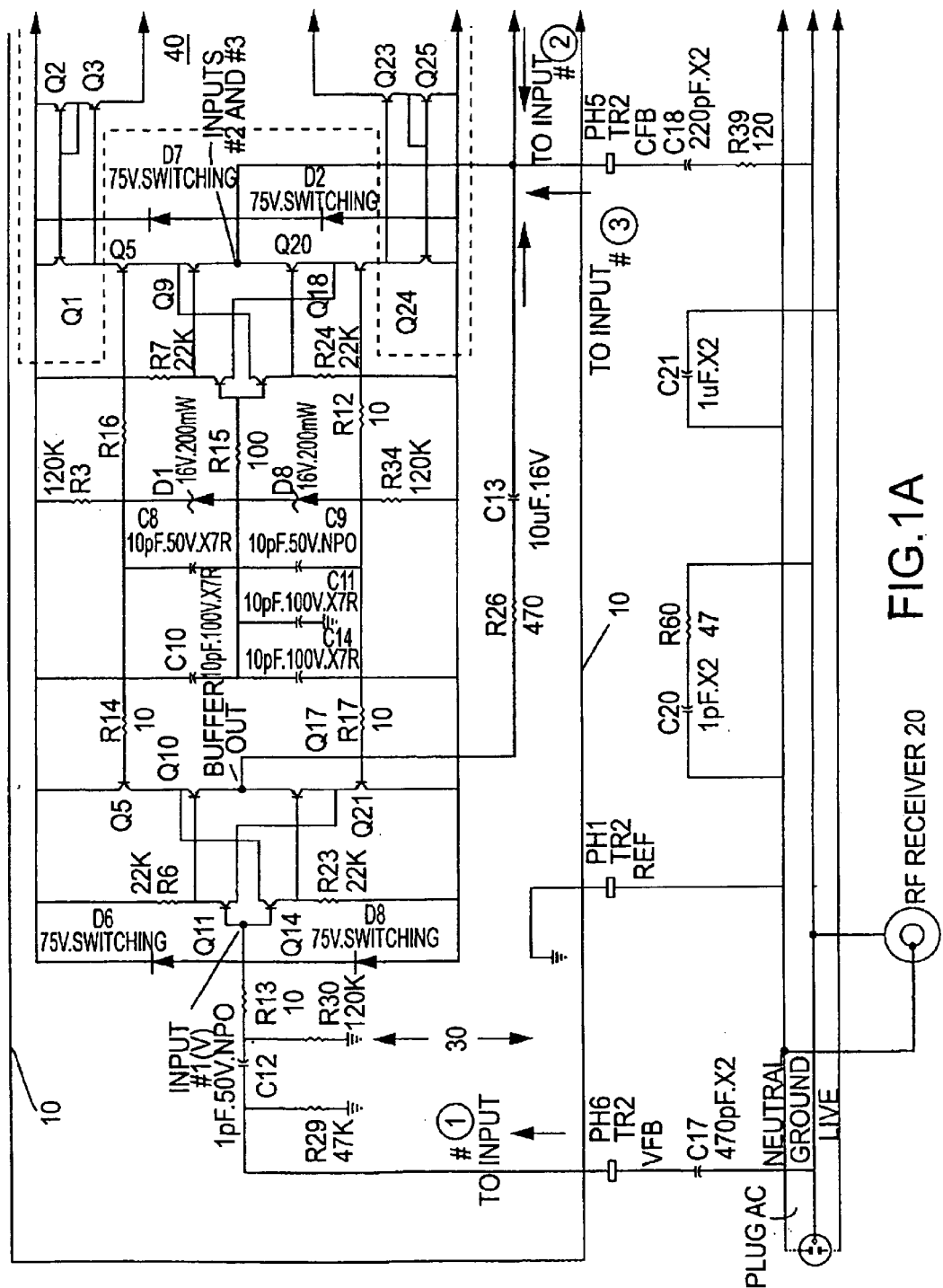
FIGS. 1A and 1B comprise a schematic circuit diagram.
Figure 1B:
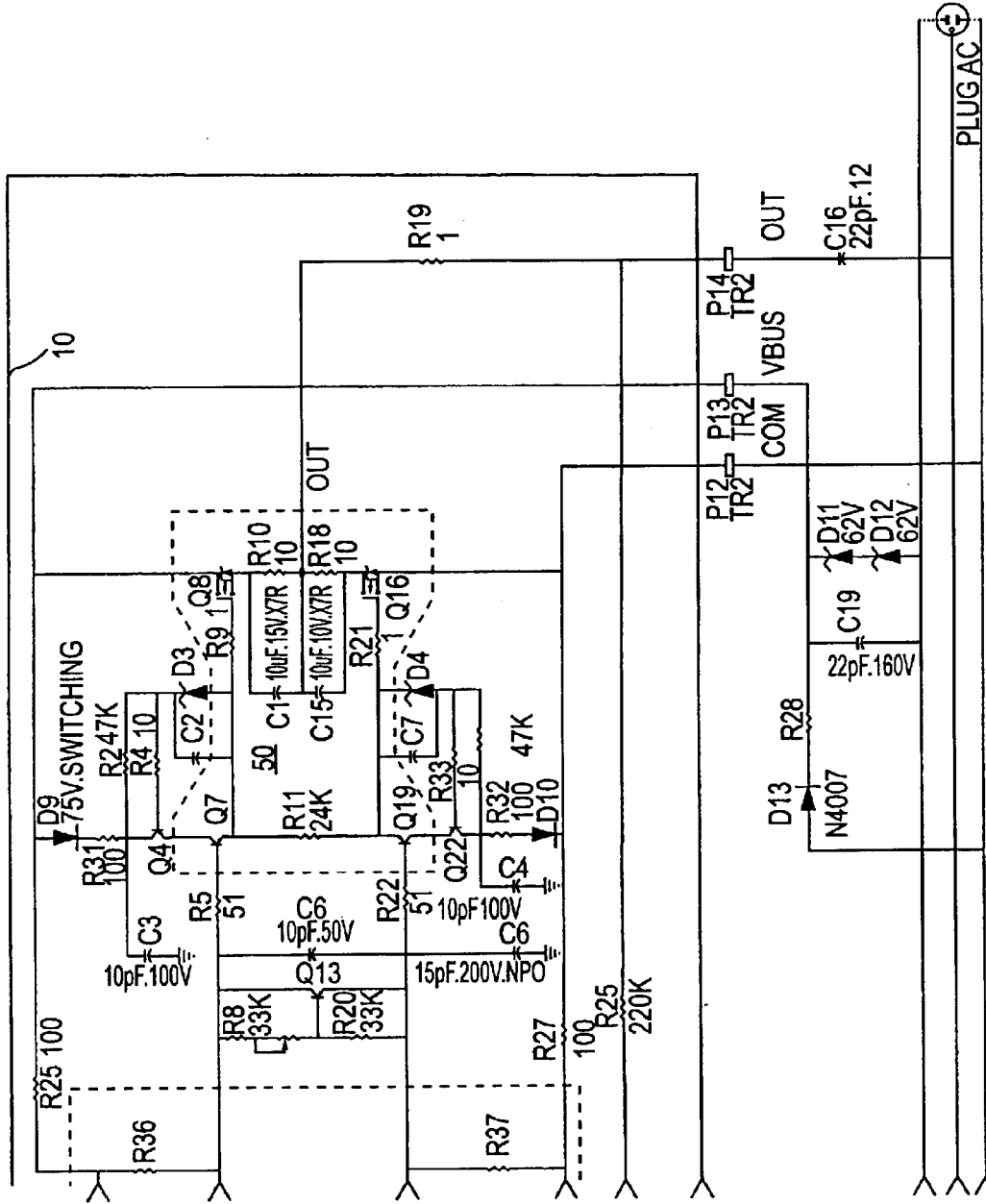
Figure 2:
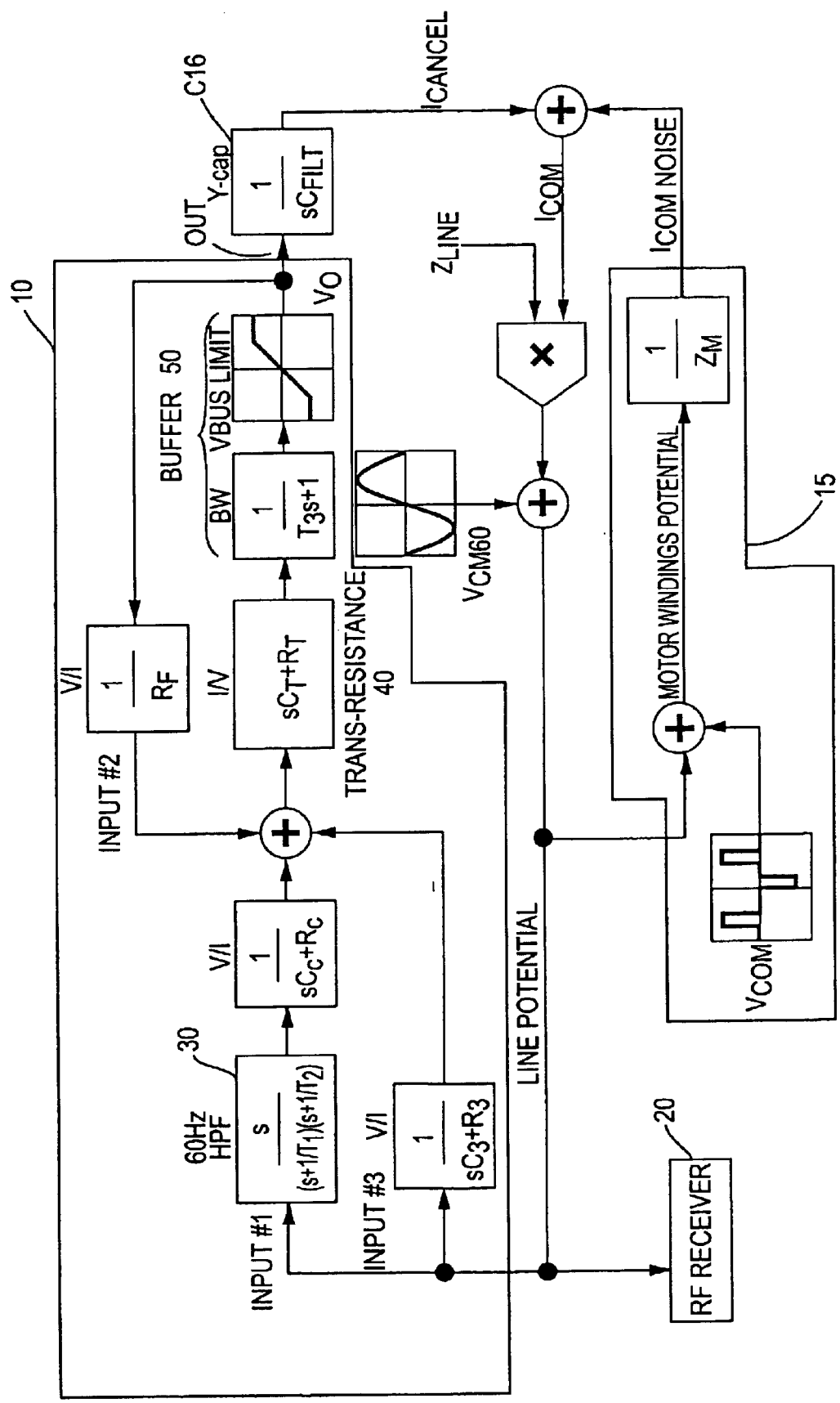
FIG. 2 is a functional block diagram, showing an embodiment of the invention.

See FIGS. 1A, 1B and 2. The error amplifier 10 is referenced to one of the AC line potentials via the REF and COM terminals, namely to the NEUTRAL line in this embodiment. Therefore, the noise voltage sensing can be done via a Y-capacitor C17 connected to ground and to a terminal VFB.

The common node noise current $I_{com\ noise}$ is generated by motor windings and driver circuitry indicated schematically by 15 in FIG. 2. The amplifier 10 amplifies the noise voltage with negative polarity. The injection current is then supplied to the ground return line by a Y-capacitor C16 between the output OUT of the amplifier 10 and ground. The canceling current is injected by this capacitor C16, which differentiates the output voltage of the amplifier with respect to the current.

The error amplifier 10 has at least two inputs, non-inverting and inverting inputs (see below), and one output.

The non-inverting input #1, the node between the bases of Q11 and Q14, senses the noise voltage potential on the GROUND line via a Y-graded capacitor C17.

An inverting input, input #3, the node between the emitters of Q9 and Q18, also senses the noise voltage potential on the GROUND line. This inverting input is connected to ground via a Y-graded capacitor C18.

An output OUT of the amplifier is connected to ground via the Y-graded capacitor C16 and leads the canceling current from the output OUT to ground, and also feeds back the output OUT to the inverting input #2, which is the node between the emitters of Q10 and Q17.

In order to avoid unintentional instability of the amplifier induced by the line impedance and to absorb a large amplitude of 60 Hz common mode voltage, there are several important considerations when doing active cancellation, for which this proposed topology features the following internal structures:

To get high input impedance, the amplifier 10 has a high impedance voltage input #1, which is the node of the bases of Q11 and Q14. High input impedance is important in order to be able to use a small capacitance for C17. This is important for common mode cancellation because it limits the total Y capacitance value needed.

To maintain the output voltage at the middle of the supply rail, the amplifier has a second input #2 that has low input impedance and receives the error signal from the output OUT in current form. The second input is the node of the emitters of Q10 and Q17. This middle point voltage maintenance is important so that the output stage of the amplifier may have maximum headroom for the next current injection.

To obtain higher frequency response and to avoid a gain-bandwidth tradeoff and slew rate limiting, the amplifier has a third input #3 that has low impedance and inputs the error signal in current form from the ground line via Y-capacitor C18 and terminal CFB. To avoid the drawbacks of the current input structure, this third input is effective mainly in the higher frequency range. The third input is the node between the emitters of Q9 and Q18. This function is effective for improving bandwidth; however, if desired, the amplifier could serve its purpose without this input.

The amplifier has a main gain stage of a transresistance amplifier 40 followed by a buffer amplifier 50 which reinforces output current capacity. The transresistance amplifier 40 includes a current mirror circuit, Q1, Q2, Q3, Q23, Q24, Q25 (FIG. 1A), and resistors R36 and R37 (FIG. 1B). The buffer amplifier 50 includes Q7, Q19, Q8, and Q16 in FIG. 1B.

Bus voltage for the amplifier 10 is provided from the LIVE line via a terminal VBUS.

In order to avoid the influence of a large 60 Hz common mode voltage signal, the amplifier has a high pass filter function 30 in the front end of the first voltage input. This filter comprises C17, R29, C12, and R30 in FIG. 1A. This function enables the amplifier to detect and cancel several 10's of mV of high frequency noise, as compared to hundreds of volts of 60 Hz.

As shown in FIGS. 1A and 2, an RF receiver 20 or any equivalent device can be provided for sensing common mode noise and/or to test the operation of the disclosed circuit.

Other possible variations include an amplifier having a current amplifier stage, instead of a voltage buffer amplifier.

Although the present invention has been described in relation to particular embodiments thereof, many other variations and modifications and other uses will become apparent to those skilled in the art. Therefore, the present invention is not limited by the specific disclosure herein.

What is claimed is:

1. A filter for an electrical power system, comprising:
an error amplifier coupled to system lines in said system, to obtain voltages related to currents in the respective lines, and operable to output a signal based on a difference in current between a pair of said lines;
the output signal being coupled to one of said lines;
wherein the output signal influences said difference in said voltages between said pair of system lines to decrease the voltage difference.

2. The circuit according to claim 1, wherein the error amplifier is coupled to said system lines by at least one capacitor.

3. The circuit according to claim 1, wherein at least one system line is an AC power line, and at least one other system line is a ground line.

4. The circuit according to claim 3, wherein said AC power line is a neutral line.

5. The circuit according to claim 1, further comprising:
a power supply to the error amplifier for powering the error amplifier; and
the power supply being coupled to one or more input lines in the electrical power system.

6. The circuit according to claim 3, wherein the error amplifier is referenced to said power line and has a first input which receives said voltage from said ground line.

7. The circuit according to claim 6, wherein the error amplifier outputs said output signal to said ground line.

8. The circuit according to claim 6, wherein said error amplifier has a second input which receives said output signal for controlling headroom of said error amplifier.

9. The circuit according to claim 8, wherein said error amplifier has a third input which receives said output signal from said ground line for controlling frequency response of said error amplifier.

10. The circuit according to claim 6, wherein said error amplifier has another input which receives said output signal from said ground line for controlling frequency response of said error amplifier.

11. The circuit according to claim 1, further comprising a high-pass filter at an input of the error amplifier.

12. The circuit according to claim 1, wherein said error amplifier comprises an input circuit and a transresistance amplifier.

13. The circuit according to claim 12, further comprising a buffer circuit which receives an output of said transresistance amplifier and delivers said output signal.

14. The circuit according to claim 1, further comprising a buffer circuit which delivers said output signal.

15. A method for reducing EMI in an electrical power circuit with an active EMI filter, comprising:
sensing a voltage on at least one of an input and ground line related to current through the line;
sensing voltage in at least another of the input and ground line;
comparing the sensed voltages and providing a voltage signal based on differences between the voltages; and
applying the voltage signal to at least one of the input and ground lines to thereby reduce the voltage difference.

16. The method according to claim 15, further comprising amplifying the voltage difference to obtain a closed loop feedback control.

17. An active EMI filter, comprising:
an error amplifier for amplifying an error signal;
a capacitor coupled to an input of the error amplifier for developing a voltage related to a sensed current;
a second capacitor coupled to a second input of the error amplifier for developing a voltage related to a sensed current; and
an output capacitor coupled to an output of the error amplifier and at least one of the first and second capacitors;
wherein the error amplifier is operable to detect a difference in voltages developed across the first and second capacitors and supply a voltage to the output capacitor to compensate the difference in voltages between the first and second capacitors.

18. The method according to claim 15, further comprising:
providing an error amplifier for carrying out said comparing and applying steps, and a power supply for powering the error amplifier; and
coupling the power supply to one or more input lines in the electrical power system.

19. The method according to claim 15, including referencing the error amplifier to said input line, wherein a first input thereof receives said voltage from said ground line.

20. The method according to claim 19, wherein the error amplifier outputs said output signal to said ground line.

21. The method according to claim 19, wherein said error amplifier has a second input which receives said output signal and controls headroom of said error amplifier.

22. The method according to claim 21, wherein said error amplifier has a third input which receives said output signal from said ground line and controls frequency response of said error amplifier.

23. The method according to claim 19, wherein said error amplifier has another input which receives said output signal from said ground line and controls frequency response of said error amplifier.

24. The method according to claim 15, wherein at least one system line is an AC power line, and at least one other system line is a ground line.

25. The method according to claim 24, wherein said AC power line is a neutral line.

26. An active EMI filter in combination with an electrical power system, comprising:

the active EMI filter of claim 17;

said error amplifier being coupled to system lines in said system, to obtain voltages related to currents in the respective lines, and operable to output a signal based on a difference in current between a pair of said lines;

the output signal being coupled to one of said lines;

wherein the output signal influences said difference in said voltages between said pair of system lines to decrease the voltage difference.

27. The circuit according to claim 17, wherein at least one system line is an AC power line, and at least one other system line is a ground line.

28. The circuit according to claim 27, wherein said AC power line is a neutral line.

29. The circuit according to claim 17, further comprising:

a power supply to the error amplifier for powering the error amplifier; and the power supply being coupled to one or more input lines in the electrical power system.

30. The circuit according to claim 17, wherein the error amplifier is referenced to said input line and has a first input which receives said voltage from said ground line.

31. The circuit according to claim 30, wherein the error amplifier outputs said output signal to said ground line.

32. The circuit according to claim 17, wherein said error amplifier has a second input which receives said output signal for controlling headroom of said error amplifier.

33. The circuit according to claim 32, wherein said error amplifier has a third input which receives said output signal from said ground line for controlling frequency response of said error amplifier.

34. The circuit according to claim 17, wherein said error amplifier has another input which receives said output signal from said ground line for controlling frequency response of said error amplifier.

* * * * *